United States Patent
Van Der Tempel et al.

(10) Patent No.: US 10,027,898 B2
(45) Date of Patent: Jul. 17, 2018

(54) TOF ILLUMINATION SYSTEM AND TOF CAMERA AND METHOD FOR OPERATING, WITH CONTROL MEANS FOR DRIVING ELECTRONIC DEVICES LOCATED IN THE SCENE

(71) Applicant: SOFTKINETIC SENSORS NV, Brussels (BE)

(72) Inventors: Ward Van Der Tempel, Muizen (BE); Julien Thollot, Woluwe Staint-Lambert (BE)

(73) Assignee: SoftKinetic Sensors NV, Brussels (BE)

( * ) Notice: Subject to any disclaimer, the term of this patent is extended or adjusted under 35 U.S.C. 154(b) by 75 days.

(21) Appl. No.: 14/360,690

(22) PCT Filed: Aug. 28, 2013

(86) PCT No.: PCT/EP2013/067794
§ 371 (c)(1),
(2) Date: May 27, 2014

(87) PCT Pub. No.: WO2014/033157
PCT Pub. Date: Mar. 6, 2014

(65) Prior Publication Data
US 2015/0181099 A1 Jun. 25, 2015

(30) Foreign Application Priority Data
Aug. 30, 2012 (EP) ..................................... 12182440

(51) Int. Cl.
*G05B 11/01* (2006.01)
*H04N 13/04* (2006.01)
(Continued)

(52) U.S. Cl.
CPC ........... *H04N 5/2354* (2013.01); *G01B 11/14* (2013.01); *G01S 7/4911* (2013.01); *G01S 17/023* (2013.01);
(Continued)

(58) Field of Classification Search
CPC .................................................. H04N 13/0497
See application file for complete search history.

(56) References Cited

U.S. PATENT DOCUMENTS 6,961,092 B1   11/2005   Kakiuchi et al.
7,855,376 B2 *  12/2010   Cantin ................... G01P 13/00
                                                   250/221
(Continued)

FOREIGN PATENT DOCUMENTS

JP    S55-34578 A    3/1980
JP    2001-41721 A   2/2001
(Continued)

*Primary Examiner* — Rebecca Volentine
(74) *Attorney, Agent, or Firm* — Wolf, Greenfield & Sacks, P.C.

(57) ABSTRACT

A system, and a method is described for use with electronic devices such as a TV display, a laptop, a PC, a media center platform, a Set Top Box or a DVD player, a light bulb, said system and method combining advantageously several separate control means into one single device. The combined control means shares at least one common property such as, as for example, the use of an IR signal to convey information signal. In particular, the invention is related to the combination of a TOF illumination system of a TOF camera and the method for operating it, with the control means for driving electronic devices located in the scene such as, as for example, an IR emitter for driving 3D IR synchronized viewing glasses.

19 Claims, 8 Drawing Sheets

(51) Int. Cl.
*G01C 3/08* (2006.01)
*H04N 5/235* (2006.01)
*G01S 17/89* (2006.01)
*G01S 17/02* (2006.01)
*G01S 7/491* (2006.01)
*G01B 11/14* (2006.01)
*G01S 17/66* (2006.01)
*H04N 13/02* (2006.01)

(52) U.S. Cl.
CPC .............. *G01S 17/89* (2013.01); *G01S 17/66* (2013.01); *H04N 13/0253* (2013.01); *H04N 13/0438* (2013.01)

(56) References Cited

U.S. PATENT DOCUMENTS

| | | | | |
|---|---|---|---|---|
| 8,217,327 | B2* | 7/2012 | Kim | G01S 7/483 250/208.1 |
| 2001/0043266 | A1 | 11/2001 | Robinson et al. | |
| 2007/0139616 | A1 | 6/2007 | Decusatis | |
| 2009/0002981 | A1* | 1/2009 | Knibbe | G01S 5/14 362/233 |
| 2010/0060722 | A1 | 3/2010 | Bell | |
| 2010/0214214 | A1* | 8/2010 | Corson | G06F 3/0346 345/158 |
| 2010/0309535 | A1* | 12/2010 | Landowski | G02B 27/2264 359/107 |
| 2011/0001808 | A1* | 1/2011 | Mentz | H04N 13/0438 348/59 |
| 2011/0037849 | A1* | 2/2011 | Niclass | G01S 7/4814 348/135 |
| 2011/0234756 | A1* | 9/2011 | Adler | G06T 5/002 348/46 |
| 2012/0208639 | A1* | 8/2012 | Reynolds | G06F 3/0488 463/36 |
| 2012/0215382 | A1* | 8/2012 | Lee | G05D 1/0033 701/2 |
| 2012/0307230 | A1* | 12/2012 | Dorrington | G01S 17/89 356/5.1 |
| 2013/0050425 | A1* | 2/2013 | Im | H04N 13/0207 348/46 |
| 2013/0131836 | A1* | 5/2013 | Katz | H04N 21/422 700/12 |
| 2013/0154913 | A1 | 6/2013 | Genc et al. | |
| 2013/0194395 | A1* | 8/2013 | Hannuksela | G02B 27/225 348/51 |
| 2013/0278503 | A1 | 10/2013 | Hirata | |

FOREIGN PATENT DOCUMENTS

| | | |
|---|---|---|
| JP | 2008-506927 A | 3/2008 |
| JP | 2009-520194 A | 5/2009 |
| WO | 2005026774 | 3/2005 |
| WO | WO 2006/000761 A1 | 1/2006 |
| WO | WO 2007/071032 A1 | 6/2007 |

* cited by examiner

TOF ILLUMINATION SYSTEM AND TOF CAMERA AND METHOD FOR OPERATING, WITH CONTROL MEANS FOR DRIVING ELECTRONIC DEVICES LOCATED IN THE SCENE

CROSS-REFERENCE TO RELATED APPLICATIONS

This application is a § 371 national stage entry of International Application No. PCT/EP2013/067794, filed Aug. 28, 2013, which claims priority to European Patent Application No. 1218440.3 filed Aug. 30, 2012, the entire contents of which are incorporated herein by reference.

The present invention relates to a system, and a method for enabling interactions at distances in a scene in between electronic devices using at least one signal carried over a modulated light. In particular, the invention relates to the combination of a TOF illumination system of a TOF camera and the method for operating it, with electronic device systems and the method for operating them, for enabling contextual interactions with other electronic devices located in the scene. Electronic device systems may comprise devices such as a TV display, a laptop, a PC, a media centre platform, a Set Top Box, a gaming console or a illumination system such as a light bulb, while other electronic devices may comprise at least signal receiving devices such as speakers, 3D shutter glasses, vacuum cleaner or other kind of remote controllable devices such as drones or home automated devices.

BACKGROUND

Infra-Red light corresponds to an electromagnetic radiation the range of which is used in telecommunication systems for carrying information data from a system to another while not being perceivable by a human being. As for example, some 3D device displays such as 3D TV comprises means for emitting a modulated IR light signal to open and close the left/right shutters of viewing glasses in synchrony with the corresponding left/right image displayed on the screen so that to allow the human visual system having a 3D perception of the displayed content. The Infrared light is used to transfer a synchronization signal from the display device to the glasses. It is understood that no single physical layer or communication protocol is used as a standard and that a multiplicity of solutions may exist. As for example, different 3D synchronization systems are using different IR light wavelengths in the range of 850 nm to 940 nm or in other range invisible for a human being. Moreover, some systems may comprise a transmission protocol using a carrier frequency whereas some others may use an unmodulated signal. Different and incompatible data signal timing protocols may also be implemented. As for example, some synchronized full time signal may be used whereas in some other embodiment a phase lock loop (PLL) may be used. Additionally, one, two or more IR emitters can be used to send the synchronization signal. Furthermore, some systems may isolate the IR emitters from the IR remote control receivers to avoid crosstalk while some others may put them right next to each other behind the same window. The multiplicity of solution is conducting the different systems to become not compatible with each other making as for example each 3D viewing glasses specific to a Brand or to a display screen. Furthermore, because some 3DTVs uses the same infrared wavelength as some remote control transceiver, typically 940 nm, interference problems may also occur in between.

A Consumer's Electronics Association's work group is investigating standardization for IR communicating device interoperability, including as for example viewing glasses for 3D TV synchronization. The communication standard should ensure that the infrared synchronization signal from the 3DTV to the active glasses is unaffected by the TV remote control signal and by other ambient optical noise sources, as well as for making remote control signals being unaffected by the synchronization signal itself. Among the possible solutions are included the selection of a specific wavelength for 3DTV infrared synchronizing signals so that to make it be different from the standard remote control wavelength signal. Another possibility is to make use of another carrier frequency, the allowable intensity of the synchronizing emitter reduced and the transmission protocol around a modulated signal is to be standardised. For example, the 3D synchronization may uses a short burst modulated signal at 25 kHz, a wavelength of 830 nm and a maximum emitter intensity of 1000 mW/sr.

An aim of the standardization of bidirectional communication through IR emitter-receivers would enable driving static devices such as:
  Sound system
  Glasses
  Remote controllers
  Major problems to be solved would be:
  Maximizing Interoperability
  Avoiding interference
  Preserving safety of humans
  The solutions expected would mainly focus on:
  Making use of an IR electromagnetic radiation
  Using some specific Modulation frequencies
  Using diffused transmission or direct line-of-sight transmission In parallel, a new technology using IR light is emerging. It concerns three-dimensional imaging device systems the aim of which is to provide depth measurements of a scene. Such three-dimensional imaging device systems, such as a time-of-flight camera system (TOF camera), are device systems that create distance data with help of the TOF principle, and in which a receiver captures modulated light which has been emitted towards the scene by a light source such as an LED based illumination system and reflected therefrom. The TOF principle relies on the measured depth being determined by the time or phase difference in the overlap between the emitted modulated signal and the received modulated signal caused by the round trip time. The received signal is correlated or mixed with a copy of the emitted signal to obtain the time and the phase difference between them two and from which a distance can be determined. Typically, the camera device system comprises an illumination unit emitting in the IR domain a modulated signal at frequencies in the range of tens to hundreds of megahertz or more. An image sensing unit optimized for capturing the wavelength range emitted captures the scene in synchrony with the scene illumination; the sensing unit field of view being included in the illumination system optical engine frustrum.

TOF camera are built for use in several conditions, including at home for room or living-room experience such as for human to machine interactions and remote control if associated to method and systems such as a gesture recognition systems. TOF cameras are thus expected to coexist in the future within the same environment than the one comprising home standard telecommunications systems which are also using IR electromagnetic radiation.

SUMMARY OF THE INVENTION

An object of the present invention is to provide a system, circuitry and a method for electronic devices such as an illumination system such as a light source or light bulb, or a TV display, a laptop, a PC, a media centre platform, a Set Top Box or a DVD player, said system and method comprising computation means and combining advantageously several separate features and preferably control means into one single device. The combined control means shares at least one common property such as, as for example, the use of a non-visible such as IR signal to convey information signal. In particular, the invention is related to the combination of a TOF illumination system of a TOF camera and the method for operating it, with the control means for driving electronic devices located in the scene such as, as for example, an IR emitter for driving 3D IR synchronized viewing glasses or for providing information to other devices.

An advantage of embodiments of the present invention is avoiding the use of multiple illumination units such as a first illumination unit, e.g. comprising a first set of LED's provided for illuminating a scene with a TOF modulated light signal, and a second illumination unit e.g. with a second set of LED's provided for the control of a device such as an illumination unit that transmits a signal such as a shutter modulated signal for operation of a further device such as glasses to be used to observe the 3D images on the display device. In particular embodiments when considering a television display, the display screen itself may be used as an emitter if it comprises IR emitting pixel units integrated into the panel (e.g. IR pixels being integrated into the Bayer standard RGB pixel unit matrix). The display itself may then become the emitter and does not require an external LED emitting unit.

Another advantage of the present invention is that one single IR light source may be used for interaction in between all the electronic devices in a scene. For example a non-visible light source such as an IR light source can be integrated into a light bulb. The present invention also includes integration of a TOF camera based system into a light source or light bulb.

A further advantage of embodiments of the present invention is that the scene does not become over-illuminated and therefore two different controls will function correctly without interferences due to high illumination power or due to similar modulation frequencies from heterogeneous illumination units.

A further another advantage of embodiments of the present invention is that the different emitted signals may be managed on one single circuit.

Another further advantage of the invention is that it can realise a method for detection, tracking and recognizing objects in the scene so that to allow contextual control and interactions.

Another further advantage of the invention is that it can realise a system for receiving information emitted by object and the related means for processing them so that to allow bidirectional interactions in-between the two systems.

Embodiments of the present invention include:
Making use of a specific electromagnetic radiation of a certain wavelength such as the specific near IR used in ToF measurement systems.

Using multiple specific Modulation frequencies emitted by the illumination system such as at least one for ToF measurement, and at least another one which should be parametric in order to be able to address different devices.

Using diffuse transmission of the ToF illumination system, e.g. to obtain a wide field of view.

In one aspect the present invention provides a system for use with a device, the system comprising:
a single illumination unit for illuminating a scene with respect to the ToF principle,
a signal generator for generating a multimodulation signal and for supplying this multimodulation signal to the illumination unit, the signal generator being adapted to provide the multimodulation signal to the illumination unit having at least one modulation co-responding to the TOF signal and at least another modulation being for use by a first object in the illuminated scene or for controlling an operation of the first object in the illuminated scene.

Another aspect of the present invention is a system for use with a device, the system comprising:
a ToF sensor arrangement including a sensor unit for use with a single illumination unit for illuminating a scene, the sensor arrangement comprising a means for determining a value related to a distance between the sensor unit and a first object in the scene based on the ToF principle, and a signal generator for generating a multimodulation signal and for supplying this signal to the illumination unit, the signal generator being adapted to provide the multimodulation signal to the illumination unit having at least one modulation for use by a second object in the illuminated scene or for controlling an operation of the second object in the illuminated scene.

Another aspect of the present invention is circuitry comprising:
a single illumination unit for illuminating a scene with respect to the ToF principle,
a signal generator for generating a multimodulation signal and for supplying this signal to the illumination unit, the signal generator being adapted to provide the multimodulation signal to the illumination unit having at least one modulation co-responding to the TOF signal and at least another modulation being for use by a first object in the illuminated scene or for controlling or operating the first object in the illuminated scene.

Optionally, the system, circuitry or method in accordance with the present invention may comprise means adapted for receiving and processing signals which may be generated by a device in a scene as a feedback information. The device in the scene may emit some signals of any kind to deliver at least feedback information to the system (or to the user) such as an ID, or another kind of feedback such as the providing notice of events, a parameter, a data (localization, status). Such communication could be achieved by a wireless connection such as uses light, radio, sound, vibration etc. The system may make use of different communication means to provide feedback, e.g. there can be feedback by any means to the system that drives the TOF illumination unit and processes the TOF camera information and/or to a user in the scene.

Preferred embodiments of the present invention make use of multimodulation to transmit information through the emitted light such as IR light. The illumination can use focused or diffusing illumination systems such as a multi-modulated ToF illumination system. Also any method of the present invention can enable unidirectional and/or bidirectional interaction in between communicating devices. The system preferably comprises the means for generating at least two modulated signals, wherein a first modulated signal is associated to a distance related parameter, e.g. a distance measurement as known from the ToF principle, and wherein at least a second signal aims to carry to the illuminated scene another signal the modulation frequency of which is different from that of the ToF signal to avoid interference, and wherein the second signal aims to drive/control/provide information to, a device in the scene.

The system circuitry or method for controlling a device in the scene may include use of an identification module that determines or locates an object in the scene automatically. The determination or location of an object can be determined for example thanks to a computer vision object recognition method, or can also be determined thanks to an object ID recognition using electromagnetic radiation reception for embodiments of the present invention that support bidirectional communications. Such embodiments support reception by the system of a signal emitted by the object and processing of the signal by the system.

In particular embodiments, the system, circuitry or method for controlling a mobile device in the scene may include a localization module in order to control device movements through the scene, said localization being performed by any suitable method such as through 3D image processing means or through 3D triangulation using electromagnetic radiation, or beamforming with—sound, light or radio waves.

The present invention also includes a multimodulated ToF illumination method, circuitry or system embedded in a camera device for enabling interactions. The camera itself may be embeddable, as for example but not limited to, in a TV display device.

A further aspect of the present invention is a method for use with a device, the method comprising:
 illuminating a scene with respect to the ToF principle using a single illumination unit,
 generating a multimodulation signal and supplying this signal to the single illumination unit, at least one modulation being provided co-responding to the TOF signal to the illumination unit, and at least another one modulation having information data for use by a first object in the illuminated scene or for controlling or operating a first object in the illuminated scene.

Yet a further aspect of the present invention is a method for use with a device, the method comprising:
 sensing using a sensor unit according to the ToF principle of light reflected from a scene illuminated by an illumination unit,
 determining a value related to a distance between the illumination unit or the sensor unit and a first object in the scene based on the ToF principle, and
 generating a multimodulation signal and supplying this signal to the illumination unit, at least one modulation being provided for use by a second object in the illuminated scene or for controlling an operation of the second object in the scene.

Accordingly embodiments of the present invention provide a circuitry or method for modulation of a single illumination unit having a single set of light sources such as LED's, that allows to use simultaneously both the TOF modulation and a second modulation to control a device such as shutter modulation for shutter glasses. Typically invisible radiation such as that produced by IR LED's can be used in any embodiment of the present invention. It is understood that other wavelength can be used if suitable for carrying the data, and suitable for not being perceivable by a human being. Further, a visible wavelength may be used if the modulation frequency is significantly greater than the one detectable by the human visual system, i.e. pulsed light fusion occurs at 24 Hz, but at least a 50 Hz frequency is required to avoid lateral vision flickering perception. However, frequencies at several MHz are much suitable for carrying information. LED lights or laser sources such as used for PMD, and are thus feasible for a ToF system.

Yet a further aspect of the present invention is a light source comprising:
 an illumination unit for illuminating a scene,
 a signal generator for generating a multimodulation signal and for supplying this multimodulation signal to the illumination unit, the signal generator being adapted to provide the multimodulation signal to the illumination unit having at least one modulation co-responding to a TOF signal and at least another modulation different from the first modulation.

The signal generator is preferably integrated into the light source.

A further aspect of the present invention is a light source comprising:
 an illumination unit for illuminating a scene,
 a signal generator for generating a multimodulation signal and for supplying this multimodulation signal to the illumination unit, the signal generator being adapted to provide the multimodulation signal to the illumination unit having at least one modulation co-responding to a TOF signal and a transmitter for transmitting a wireless signal operating to a wireless communications protocol.

The signal generator is preferably integrated into the light source.

The illumination system in any embodiment of the present invention may have a wide field of view ensuring that the device to be controlled such as the 3D television shutter glasses, or a vacuum cleaner is in receiving range. If sufficient power is provided to the illumination unit, e.g. with a set of LED's, this ensures receiving sufficient light in the TOF receiver that is reflected from the scene.

Other preferred embodiments also use bidirectional interactions in between an object to be controlled in the scene combined with gesture based interactions associating a user and a device. E.g. a user handles a remote control device having transceiver and feedback devices such as a vibrator for feeding an information signal to the human operator. The system can refine a user model representation provided by skeleton tracking software means thanks to the remote control device, and the delivering of feedback information to the user is thanks to the vibrator, when its virtual representation enter into collision in a virtual scene with a virtual object.

Another embodiment includes a light source that is integrated with means for multimodulation to transmit information through emitted light. The illumination can use focused or diffusing illumination systems such as a multimodulated ToF illumination system. Also the light source can enable unidirectional and/or bidirectional interaction in between communicating devices. The light source preferably comprises means for generating at least two modulated signals, wherein a first modulated signal is associated to a distance related parameter, e.g. a distance measurement as known from the ToF principle, and wherein at least a second signal aims to carry to the illuminated scene another signal the modulation frequency of which is different from that of the ToF signal to avoid interference, and wherein the second signal aims to drive/control/provide information to, a device in the scene or a network element.

Accordingly, the light source comprises circuitry for modulation of a single illumination unit having a single set of light sources such as LED's, that allows to use simultaneously both the TOF modulation and at least a second modulation to control a device in the scene or a network element. Typically invisible radiation such as that produced by IR LED's can be used. It is understood that other wavelength can be used if suitable for carrying the data, and suitable for not being perceivable by a human being. LED lights or laser sources are thus feasible for a ToF system.

Optionally, the light source may comprise means adapted for receiving and processing signals which may be generated by a device in a scene as a feedback information. The device in the scene may emit some signals of any kind to deliver at least feedback information to the system (or to the user) such as an ID, or another kind of feedback such as the providing notice of events, a parameter, a data (localization, status). Such communication could be achieved by a wireless connection such as uses light, radio, sound, vibration etc. The system may make use of different communication means to provide feedback, e.g. there can be feedback by any means to the system that drives the TOF illumination unit and processes the TOF camera information and/or to a user in the scene.

DESCRIPTION OF THE ILLUSTRATIVE EMBODIMENTS

Figure 1:
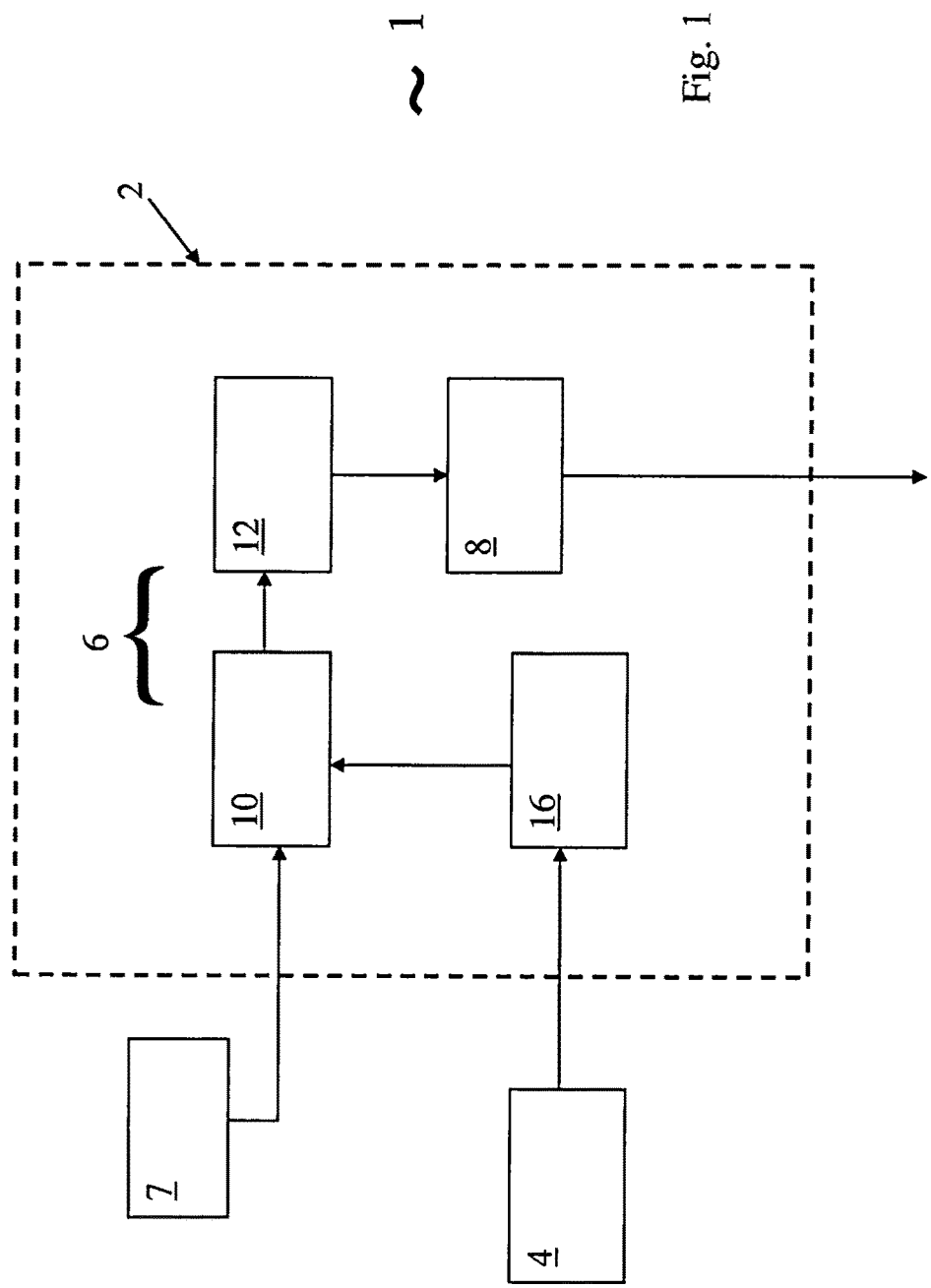
FIG. 1 shows components comprised in an illumination unit according to an embodiment of the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

An embodiment of the present invention relates to a system, device and method that can perform a range finding measurement.

In TOF measurement, the round-trip time of illuminating light such as visible or non-visible light such as IR light of a TOF camera system to travel to points in a scene and coming back from those points by reflection (i.e. from objects) to the TOF camera system is measured. The time may be determined by any suitable method, e.g. by measuring a phase offset between the emitted illuminating light signal and the reflected light signal captured by the camera sensor. In a conventional TOF camera system, the illuminating light comprises periodically modulated light. In one option for determining the time of flight the phase delay between the emitted light from the TOF camera system to illuminate the scene and received reflected light from the scene is determined. This phase delay can then, using the period length and speed of light, be converted into a measured distance, that is, the distance of at least one point of an object from the TOF camera system. This can be done on a pixel-by-pixel basis. In essence, a TOF distance measurement, D, can be determined as:

$$D = \left(\frac{c}{2f}\right) * \left(\frac{\text{phase\_deg} + k.360}{360}\right)$$

where c is the speed of light, f is the frequency of the modulated light, phase_deg is the phase shift in degrees, and k is related to the number of periods that have been aliased. The first factor in this equation is the aliasing distance, for a system with no provision for de-aliasing, this corresponds to the unambiguous distance, being:

$$D = \left(\frac{c}{2f}\right)$$

This distance represents the maximum distance that can be covered within one period. Larger distances will cycle k, and will therefore, if present in the image, be aliased and a separate determination of k allows unambiguous distance measurements.

Figure 3:
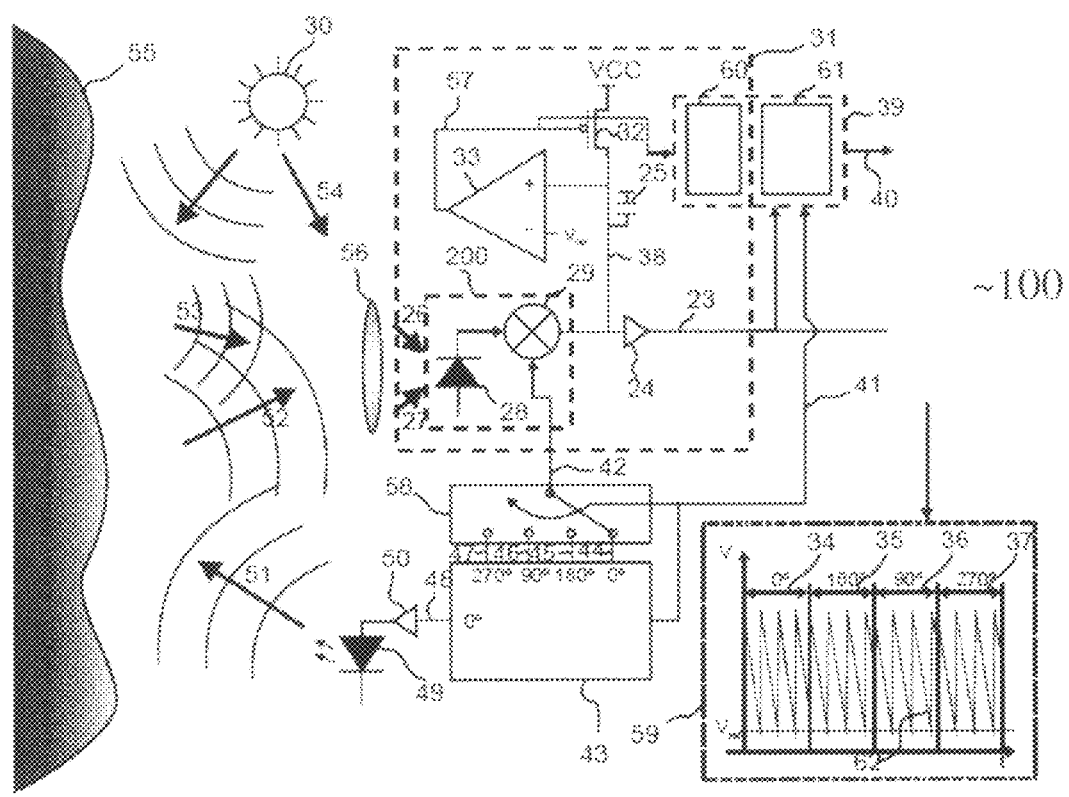
FIG. 3 shows a basic ToF camera device according to an embodiment of the present invention.

FIG. 3 shows an embodiment according to the present invention of an enhanced TOF range finding system 100 that can be included as an extra component or can be embedded in a camera or in a display or other device. The circuits in this embodiment may be included in any of the embodiments of the present invention. The range finding system comprises a single illumination unit comprising one or more light sources 49 for emitting periodic light 51 onto a scene 55, preferably focussed onto an area of interest, where the light is reflected by scene objects. The periodic light can be in the form of waves or pulses or combinations of the two. The periodic light can have a periodicity that is a certain and constant or the frequency may be varied in a regular manner, e.g. may be spread. If a wide field of view is required, a wide angle illumination may be provided. The light may be in a visible or non-visible region of the spectrum, e.g. preferably in the infra-red domain so as to be in a range for which, sensors systems are efficient, the human eye is blind and suitable light sources are available such as LED's. In accordance with this and with other embodiments of the present invention the illumination unit projects a multimodulated light. The multimodulation includes a periodic light signal 51 which is to be used for range finding and optionally for generation of 3D images. The multimodulated light is projected at two or more modulation frequencies such as at least one frequency for ToF measurements, and at least at one another frequency which is parametric in order to be able to provide information signal to one or more different devices within the scene. Information is carried in at least one modulated signal of the multimodulated light signal and a device in the scene is adapted to receive the corresponding modulated light signal and for being controlled by it, e.g. by extracting the information and acting upon it. The device can be shutter glasses for example whereby the information extracted is used to phase the shutter glasses in synchrony with a 3D image on a display device so that the wearer perceives properly a 3D image. Typically IR LED's are used in the illumination unit for the light sources 49. Such LED lights are used for PMD, and are thus be feasible for a ToF system. However, it is understood for a skilled person in the art that any kind of light source might be used if satisfying illumination power, wavelength, heat, size and switching rate specifications required by a ToF illumination principle.

In order for the light source 49 to emit modulated light, one or more signal generators 43 are provided. Each or the signal generator 43 generates a modulation signal or modulation signals on node 48 that is preferably permanently oscillating at a predetermined frequency, e.g. at about 10 MHz or more.

One of the signal generators 43 can also generate similar related offset clock signals such as second to fifth clock signals which are delivered onto nodes 44, 45, 46, 47, respectively, having a 0°, 180°, 90° and 270° phase relation with the first clock signal on node 48. These signals will be used for ToF measurements. A person skilled in the art can also consider using other or more clock phases in the operation scheme, more clock phases leading towards better measurement precision in exchange for a longer measurement time. Selector 58 is switching sequentially between the four phases connecting the input node 42 of a mixer 29 of a detector and mixer stage 200 with the second to fifth clock signals on nodes 44, 45, 46 and 47 sequentially for ToF measurements. At each of these positions selector 58 can stay connected for a relaxation period of e.g. about 1 ms.

One signal generator also generates signals at a different frequency that can be used to communicate with another device such as shutter glasses, wireless speakers, vacuum cleaners, drones, or remote control devices at a different and specific frequency. The said other signal is modulated in a way to carry information to control the device located in the frustum of the optical engine illuminating the observed scene. The illumination system aims to provide a signal to a device in the scene to control it, and to provide a ToF signal to perform range finding on the scene into which a device to be controlled might be located. The interaction between the illumination unit and the device is usually monodirectional, e.g. commands sent from the illumination unit to the device so that the illumination system provides a monodirectional signal.

The range finding system further comprises at least one sensing unit, e.g. a pixel 31 for receiving reflected light from the scene. The signal from this sensor is processed to obtain depth information and optionally any other feedback information, e.g. from one or more devices in the scene. To process the signals a processing unit is provided. Accordingly, Considering the entire system comprising a sensor or camera, an illumination unit, a receiver unit, and a processing unit associated therewith, and the device having means for providing information to the entire system wirelessly, then the interaction in between the system and the device can be either mono or bidirectional. One of the signal generators 43 can be controlled, e.g. by a controller to impose information onto the light signal by any known means, e.g. amplitude, frequency, code modulation. The said other signal can also be monodirectional, i.e. from the illumination to the other device only. A signal from the device can be received e.g. by an optical, sonic or any other type of wireless receiver.

By suitable filtering either or any of the different modulated signals present in the reflected light can be extracted. For example, one signal generator 43 can generate a control signal that is determining the behaviour of one or more devices in the scene, e.g. shutter glasses and this signal may be filtered out of the signal that is received at the device. Alternatively separate receivers can be used for each frequency.

Returning to FIG. 3, buffer 50 drives the light source 49 that emits its light 51 onto the scene 55, which can be focused on the area of interest or can have a wide field of view. The light may be in a visible or non-visible region of the spectrum, e.g. preferably in the infra-red domain so as to be in a range for which, sensors systems are efficient, the human eye is blind and suitable light sources are available such as LED's. Part of this light will be reflected, thus generating reflected light 52. At least part of this reflected light 52 then arrives at an optical focussing system for the ToF measurements such as a lens 56, through which it is imaged or focussed on a detector 28 inside pixel 31, where the incident fraction is called the reflected modulated light (ML) 27.

Part of the light 52 can arrive at an optical focussing system for extracting the information in the other signal by conventional means, i.e. optical sensor and receiver architecture.

Indirect light 53 and direct light 54, both originating from secondary light sources 30 not intended for the TOF measurement, will also be present in the scene, impinge on the optical focussing system 56 and thus be focused on the detector 28. The part of this light entering detector 28 will be called background light (BL) 26. Light sources 30 generating BL include incandescent lamps, TL-lamps, sunlight, daylight, remote control light, or whatever other light that is present on the scene and does not emanate from the light source 49 for TOF measurement.

ML 27 and BL 26 impinge onto the photodetector 28, and generate, respectively, an ML-current and a BL-current, which are photo-induced current responses to the impinging BL 26 and ML 27. Detector 28 outputs these currents to a subsequent mixing means, e.g. mixer 29, for mixing the current responses to the impinging BL 26 and ML 27 with the phase-shifted clock signal on input node 42. This BL 26 can induce a BL-current of up to 6 orders of magnitude higher than the ML-current induced by the ML 27 received for TOF measurements.

Detector 28 and mixer 29, forming detector and mixer stage 200, can as well be implemented as one single device, for example as described in EP1513202A1, where the photo-generated charges are mixed generating the mixing product current at once.

The detector and mixer stage 200 will generate the mixing products of the current responses to the impinging BL 26 and ML 27 with phase-shifted clock signals, and these signals are being integrated on node 38 by means of an integrator, for example implemented with a capacitor 25, which preferably is kept small, e.g. the parasitic capacitance of the surrounding transistors. During integration, an automatic reset of the mixer output signal on the integrator node 38 is performed. This is performed for both the first and second frequencies.

This may for example be implemented by a comparator 33 triggering a reset switch, e.g. reset transistor 32, so that the mixer output signal on node 38 is automatically reset whenever it reaches a reference value Vref, thus avoiding saturation.

In alternative embodiments, not illustrated in the drawings, the automatic reset of the mixer output signal on the integrator node 38 can be implemented in several other ways. One of them is triggering a charge pump, instead of the reset switch 32, to add a fixed amount of charges to capacitor 25 yielding a better noise performance at the cost of some more complexity.

The mixing products forming the mixer output signal are available in a sequential form synchronised with the modulation signal alteration means, in the example illustrated selector 58, at integrator node 38. An output driver 24, e.g. a buffer, provides a voltage gain substantially of one and current amplification so as to provide a stronger output signal at output node 23.

By filtering either the signals at the first or second frequency can be extracted from the reflected signals from the object under view. From these signals depth measurements are obtained per pixel for example. These depth values can be used to generate a 3D image.

A further embodiment relates to a system and method that can provide/transmit information to a device in a scene thanks to an illumination system.

A further embodiment relates to driving circuitry of an illumination system that can be combined with either of the above systems.

FIG. 1 shows an illumination system 1 in accordance with an embodiment of the present invention. The system includes one or more light sources 8 such as LED's, OLED's or similar and a driver unit 6 for driving the light sources. The light may be in a visible or non-visible region of the spectrum, e.g. preferably in the infra-red domain so as to be in a range for which, sensors systems are efficient, the human eye is blind and suitable light sources are available such as LED's. The driver unit 6 may include a booster circuit 12 and a switching circuit 10. The switching circuit 10 receives power from a power source 7 such as the mains, a battery or solar cells. The switching circuit is controlled by a controller 16 that receives control signals from one or more signal generators 4. The signal generators 4 generate a multimodulated signal that is used to drive the light sources 8 via the switching circuit 10 and the booster circuit 12. The multimodulated signals can include signals suitable for TOF measurements such as pulses or waves and a signal that can be used to drive or communicate with a further device in the environment. This latter signal can control such a further device, e.g. can provide the signal timing for shutter glasses for use in a 3D viewing system. A further embodiment relates to a system and method that may comprise at least a receiver to collect information provided by a device in a scene, including the related circuitry, Still a further embodiment, relates to a system and method that can interact mono- or uni-directionally with a device in a scene. An example is an illumination system of a range finding measurement unit embedded in a TV display device that provides a synchronisation signal to 3D shutter glasses or that provides an audio signal to speakers located within the illumination system field of view.

Figure 2:
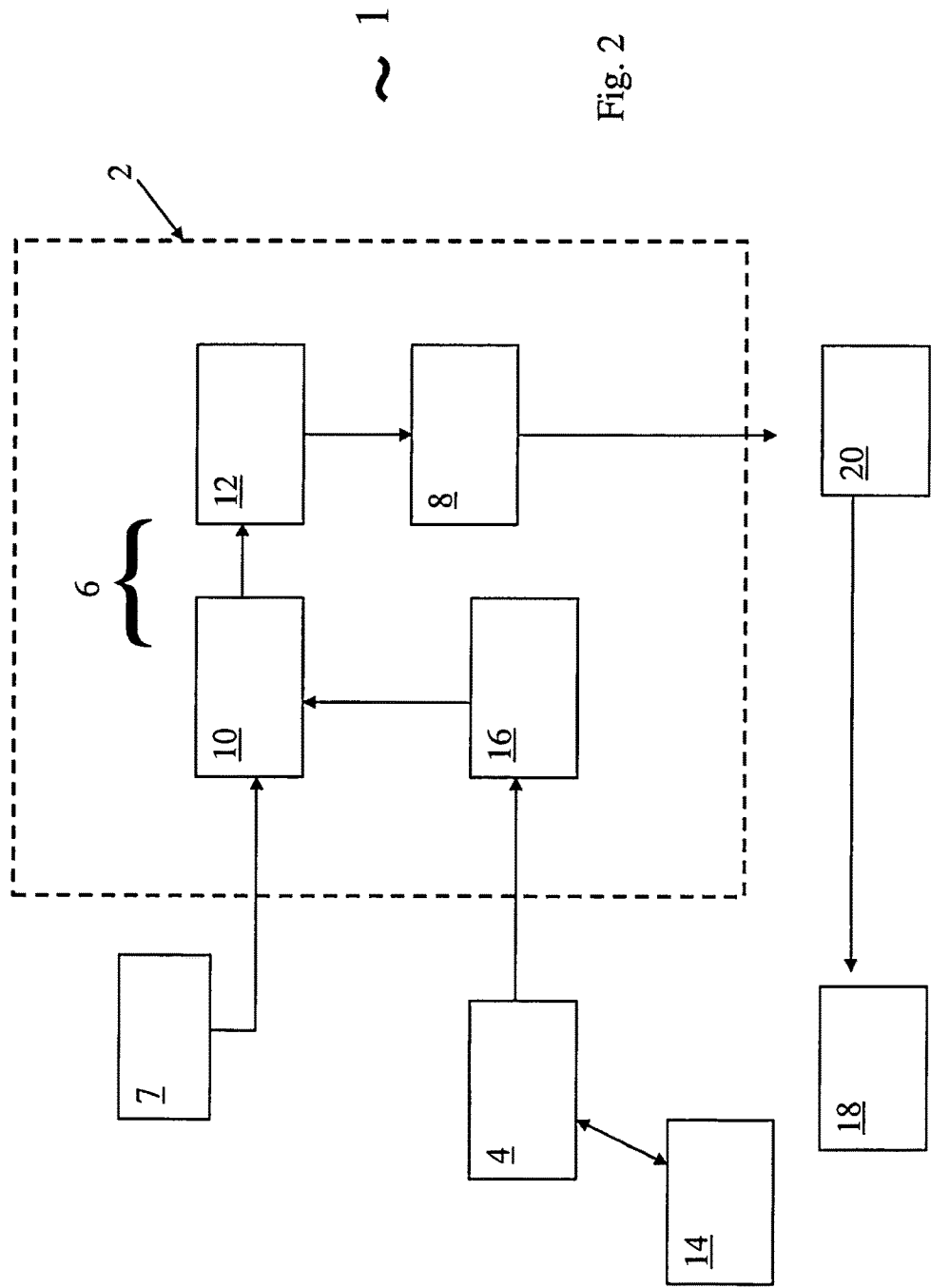
FIG. 2 shows components comprised in an illumination unit for a bidirectional interaction system according to an embodiment of the present invention.

FIG. 2 shows a further illumination system 1 in accordance with an embodiment of the present invention which has many common components with the system of FIG. 1. The system includes one or more light sources 8 such as LED's, OLED's or similar and a driver unit 6 for driving the light sources. The light may be in a visible or non-visible region of the spectrum, e.g. preferably in the infra-red domain so as to be in a range for which, sensors systems are efficient, the human eye is blind and suitable light sources are available such as LED's. The driver unit 6 may include a booster circuit 12 and a switching circuit 10. The switching circuit 10 receives power from a power source 7 such as the mains, a battery or solar cells. The switching circuit is controlled by a controller 16 that receives control signals from one or more signal generators 4. The signal generators 4 generate a multimodulated signal that is used to drive the light sources 8 via the switching circuit 10 and the booster circuit 12. The multimodulated signals can include signals suitable for TOF measurements such as pulses or waves and a signal that can be used to drive or communicate with a further device in the environment. This latter signal can control such a further device 20, e.g. can provide the signal timing for shutter glasses for use in a 3D viewing system. However in this embodiment it is preferred if the communication with the further device 20 is bidirectional. Signals emitted by the device 20 are received at a receiver 18 which can be a wireless receiver. Ultrasound, optical, invisible light, radio frequency wireless, point-to-point or diffuse infra-red are any similar communication method can be used for communication between the further device 20 and the receiver 18. The further device 20 is equipped with not only a receiver for the light from the illumination system 1 but also a transmitter and a processor for generating the relevant signals for transmission to the receiver 18. Light reflected back from objects such as the further object 20 is received at a optical ToF receiver 14. This receiver may include or may be connected with the necessary processing circuits such that a distance related value can be determined by time or phase differences between the light emitted by the illumination system 1 and the received light reflected from objects in the scene which is received at receiver 14.

As an option in any embodiments of the present invention, an additional receiver such as 18 in FIG. 2 may be provided for receiving a signal form one or each external device in the scene. The signal can be of any kind to deliver at least an ID of a device, or other kind of feedback such as events, parameter, data (localization). Such communication does not need to be a light signal but could be achieved by radio, sound etc. provided the appropriate receiver is available in the system 10.

Accordingly, yet a further embodiment relates to a system and method that can interact bidirectionally with a device in a scene. An example is a range finding system that can detect and track a device in the scene using 3D image processing onto input depth maps. For example, the tracked device may be a vacuum cleaner which provides return information about container status, distance, presence of obstacles, power supply status . . . etc. Thanks to these feedback signals, specific control return actions may be generated, as for example, a full container signal activates a computerized system that drives the range finding apparatus to send a control signal to make the vacuum cleaner go back to its dock, e.g. for servicing.

Figure 4:
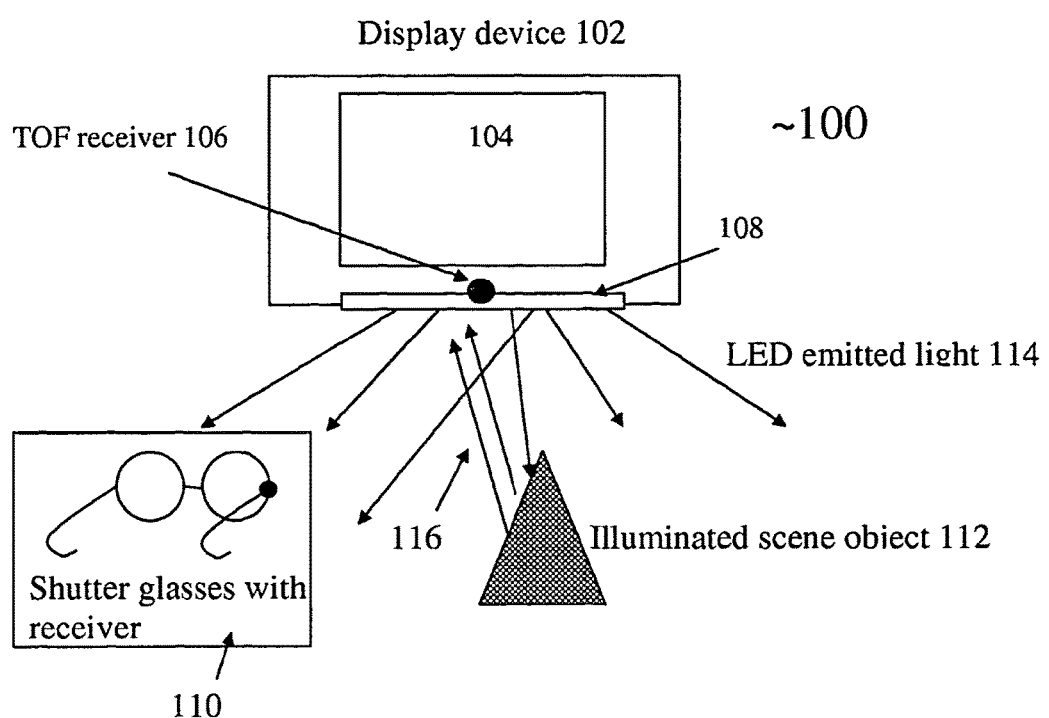
FIG. 4 shows a TOF camera embedded in a display device and illuminating a scene having devices to be controlled according to an embodiment of the present invention.

FIG. 4 shows a display system 100 in accordance with an embodiment of the present invention. The display system is only an example of an advantageous application of the present invention. The display system includes a display device 102 such as a television or a personal computer with a display screen 104, or a video display device, e.g. for an optical disk replay device such as a standalone DVD player, or a home theatre system, or a game console system. In particular any of these systems can be suitable for generation of a 3D image. An illumination unit is provided by light emitter 108 which is for light emissions 114 into the scene.

The light may be in a visible or non-visible region of the spectrum, e.g. preferably in the infra-red domain so as to be in a range for which, sensors systems are efficient, the human eye is blind and suitable light sources are available such as LED's. The illumination unit is used for ToF measurements, but can also be used for emission of a separate modulated signal for control of one or more devices in the scene. The light emitter can be an infrared emitter for example, i.e. a non-visible light emitter. This emitter can be the same as an emitter that is used for remote control of a television. A receiver 106 is also provided, e.g. a receiver to be used for ToF measurements, e.g. the emitter is able to receive light 116 reflected from objects 112 and/or objects or devices 110 in the scene. The receiver 106 may also be used for receipt of information signals from any or each of the active devices 110 in the scene or a separate receiver can be provided therefore. Further there is one device 110 located in the scene such as shutter glasses that is controlled by light communication from the emitter 108 as described in a general manner above with reference to any of FIGS. 1 to 3.

In another embodiment, the system can interact bidirectionally with a device in the scene: for example the device may be a vacuum cleaner that can provide information such as container status, distance, by transmitting such information on any suitable communication medium such as RF wireless, point-to-point or diffuse infra-red, ultrasound. The illumination system can provide information according to this status. Another example is a range finding system which detects and tracks a device in the scene, e.g. a handheld remote controller. The controller has a feedback device such as a vibrator, for giving a feedback or indication to a human to provide information. The system tracks the location of the person e.g. by means of a ToF camera and 3D image generation and provides to the controller information to make the vibrator vibrate if the device has reached a specific location.

Figure 5:
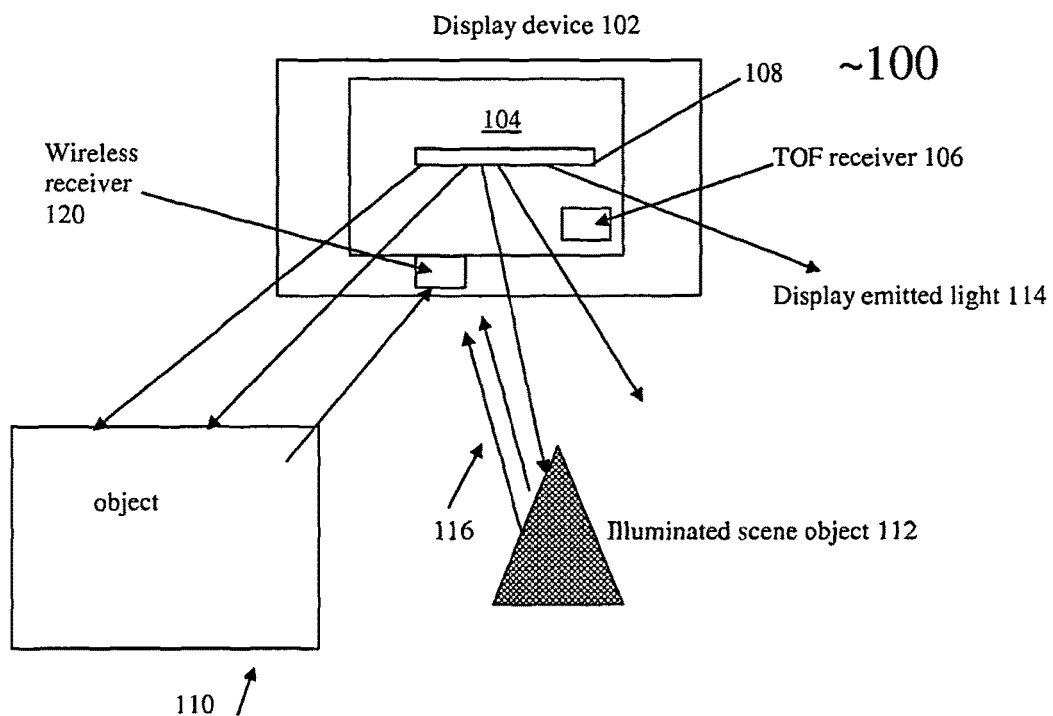
FIG. 5 shows a further TOF camera embedded in a display device and illuminating a scene having a monodirectional interaction (the ToF camera provide information to a tracking system process, which decides transfering commands to a tracked object in the scene according to an embodiment of the present invention.

FIG. 5 shows a display system 100 in accordance with another embodiment of the present invention of this type. The display system is only an example of an advantageous application of the present invention. The display system includes a display device 102 such as a television or a personal computer with a display screen 104, or a video display device, e.g. for an optical disk replay device such as a standalone DVD player, or a home theatre system, or a game console system. In particular any of these systems can be suitable for generation of a 3D image. An illumination unit is provided by light emitter 108 which is for light emissions 114 into the scene and which is a part of the display 104. In other words some of the pixels of the display can be adapted to emit light such as visiable or non-visible light, e.g. infrared light controlled separately from the image displayed for viewing by a person. The illumination unit is used for ToF measurements, but can also be used for emission of a separate modulated signal for control of one or more devices in the scene. The light emitter can be an infrared emitter for example, i.e. a non-visible light emitter. A receiver 106 is also provided, e.g. a receiver to be used for ToF measurements, e.g. the receiver 106 is able to receive light 116 reflected from objects 112 and/or objects or devices 110 in the scene. The receiver 106 may also be used for receipt of information signals from any or each of the active devices 110 in the scene or a separate receiver 120 can be provided therefore. Further there is one device 110 such as shutter glasses that is controlled by light communication from the emitter 108 as described in a general manner above with reference to any of FIGS. 1 to 3.

Figure 6:
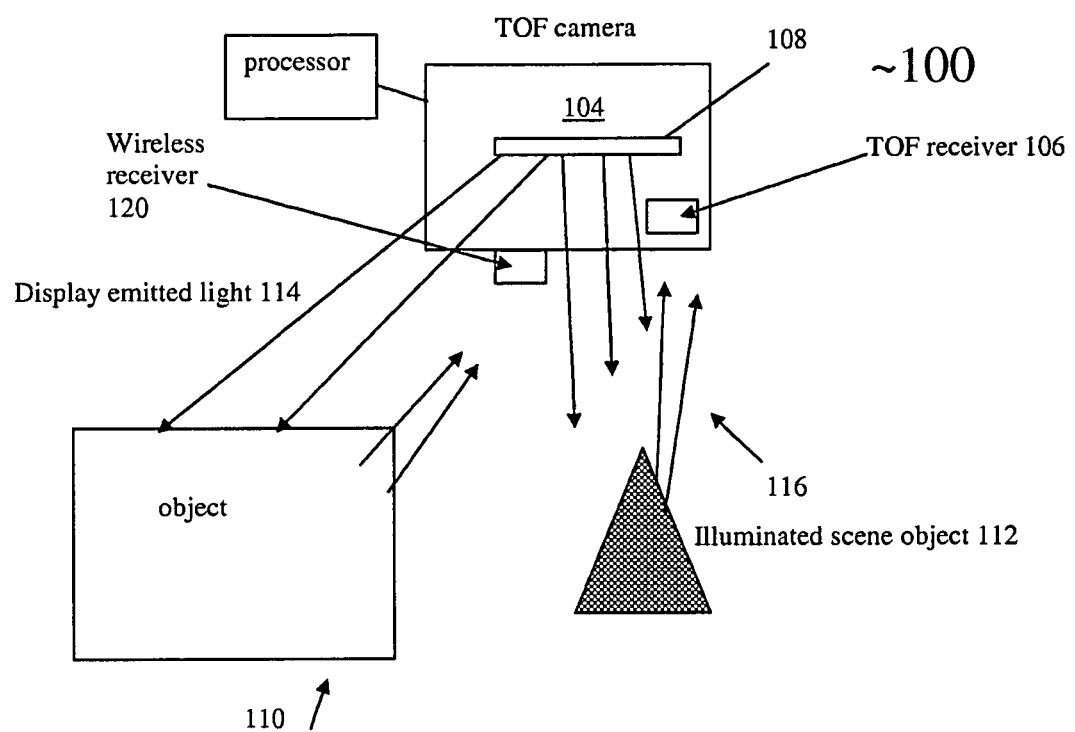
FIG. 6 shows a further TOF camera embedded in a display device and illuminating a scene having a bidirectional interaction (the ToF camera provide information to a tracking system process, which decides transfering commands to an object in the scene with respect to the information provided by said object according to an embodiment of the present invention.

FIG. 6 shows a display system 100 in accordance with another embodiment of the present invention. The display system is only an example of an advantageous application of the present invention. The display system includes a display device 102 such as a television or a personal computer with a display screen 104, or a video display device, e.g. for an optical disk replay device such as a standalone DVD player, or a home theatre system, or a game console system or a camera. In particular any of these systems can be suitable for generation of a 3D image. The display system 100 can have the function of a ToF camera. An illumination unit is provided by light emitter 108 which is for light emissions 114 into the scene and which is a part of the display 104. The light emitter 108 is therefore integrated into the display. The light may be in a visible or non-visible region of the spectrum, e.g. preferably in the infra-red domain so as to be in a range for which, sensors systems are efficient, the human eye is blind and suitable light sources are available such as LED's. The illumination unit is used for ToF measurements, but can also be used for emission of a separate modulated signal for control of one or more devices 110 in the scene. The light emitter 108 can be an infrared emitter for example, i.e. a non-visible light emitter. A receiver 106 is also provided, e.g. a receiver to be used for ToF measurements, e.g. the receiver 106 is able to receive light 116 reflected from objects 112 and/or objects or devices 110 in the scene. The receiver 106 may be provided integrated into the display 104.

In the embodiments of FIG. 4 or 5 or 6 a further receiver 120 may be provided for receipt of information signals from any or each of the active devices 110 in the scene. The receiver 120 may be any suitable wireless receiver or combination of receivers e.g. for optical, point-to-point infra-red, radio frequency wireless, ultrasound or other communication method. Further there is one device 110 that is controlled by light communication from the emitter 108 as described in a general manner above with reference to any of FIGS. 1 to 3. The object 110 also includes an emitter that can send the appropriate signals to the receiver 120 to make a bidirectional communication.

The receiver 120 or 106 in any of the above embodiments can be adapted to provide a system and method that can interact bidirectionally with a device in a scene, said device being for use in combination with a human gesture recognition based interaction system. In particular, this embodiment comprises a system that enables the tracking of a user within a scene thanks to the signal processing of the data provided by the range finding measurement unit (e.g. comprising an IR illumination unit). Human gesture recognition can be based on a user skeleton representation which may be modelled to recognise dynamic user gestures or static user positions of limbs a 3D space recognized and determined at any time thanks to said signal processing. The device in the scene may be a remote control device handled by the user, and may have transceiver and information feedback capabilities. The information feedback capabilities may be provided to the user with, as for example, a vibrator unit, a speaker, a light, a display . . . etc. That is the feedback unit may provide a feedback that relates to any human sensory response, or it may relate to a sensed property of the system to which the device is wirelessly connected, as for example, acceleration, speed and relative position data provided by embedded inertial sensing units. In that preferred embodiment, the handled device data provided to the system are used to help in refining the tracking of the user or of a user part that is used to handle the device (e.g. a hand, especially when said part is occluded and not tracked by the gesture recognition system). Moreover, according to the gesture and the position of the user handling the device, the system that collects and processes the range finding measurements, and that controls the illumination unit, may send through said illumination unit a feedback control information that will be received by the handled device so as to activate at least one of the user related feedback units. As for example, the user will experience a vibration thanks to the handled device each time a gesture is performed awaited by the system, or experience a sound if performing an action not allowed by the system such as when moving out of a certain area in the scene. Bidirectional feedbacks may be related to a specific application and determined contextually.

Embodiments of the present invention make use of a specific electromagnetic radiation of a certain wavelength such as the specific near IR used in ToF measurement systems for the illumination unit. The illumination unit emits light that has multiple specific modulation frequencies such as at least one for ToF measurement, and at least another one which should be parametric in order to be able to address different devices. The illumination unit may provide diffuse light transmission, e.g. of the ToF illumination system. The emitter design is compliant with ToF illumination principle so as to cover the scene in a suitable way.

As an option in any embodiments of the present invention, one or each object or device 110 in the scene having a receiver compliant with the display system emitted light may also comprise an emitter to provide a signal of any kind to deliver at least its ID, or other kind of feedback such as events, parameter, data (localization). Such communication does not need to be necessarily a light signal but could be achieved by radio, sound or any suitable radiometric wireless communication system known provided the appropriate receiver is available in the display device 102. Hence an object ID recognition can be provided through electromagnetic radiation reception. As a further example, an identification module can be provided in the display system 100 that makes use of the ToF receiver 106 or another receiver and is able to generate and examine images of the scene and process these for example by a computer vision object recognition method, in order to identify an object or device 110.

Embodiments of the present invention make use of multimodulation, IR emitting light, using diffusing illumination systems, e.g. a multimodulated ToF illumination system and method for interaction, the system embedding at least two modulated signals, wherein a first modulated signal is associated to a distance related parameter, e.g. a distance measurement as is known from the ToF principle, and where at least a second signal aims to carry to the illuminated scene another signal the modulation frequency of which is different from that of the ToF signal to avoid interference, and wherein the second signal aims to drive/control a device in the scene.

Embodiments of the present invention provide a method of controlling an object such as a mobile device 110 in the scene, e.g. using a localization module in display device 102 in order to control device movements through the scene.

Embodiments of the present invention include a multimodulated ToF illumination method and system for bidirectional interaction being embedded in a camera device. The camera device may be embedded in a display device 102 or may be a separate item connected to the display itself or to another device having signal processing means.

Accordingly in embodiments of the present invention a method is provided for modulation of a single illumination unit having a single set of lights such as LED's in the single illumination unit that allows to use simultaneously both the TOF modulation and the modulation to control an object or device 110 such as a shutter modulation for shutter glasses. The light may be in a visible or non-visible region of the spectrum, e.g. preferably in the infra-red domain so as to be in a range for which, sensors systems are efficient, the human eye is blind and suitable light sources are available such as LED's. Typically IR LED's are used in the illumination unit. Such LED lights are used for PMD, and are thus be feasible for a ToF system. The illumination system may have a wide field of view ensuring that the device to be controlled such as the 3D television shutter glasses are in receiving range. If sufficient power is provided to the illumination unit, e.g. with a set of LED's, this ensures receiving sufficient light in the TOF receiver that is reflected from the scene.

As a particular example, the object or device 110 may also comprise at least one active electronic, mechanical, hydraulic, electrical, electromagnetic or optical device whose operation can be controlled by the information carrying second modulated signal. The second signal received at the device from the ToF illumination unit may be demodulated and drives a command to activate or modify the operation of the device.

The present invention allows wide application in many fields and is not restricted to the display system described above. For example an illumination unit, optical sensor, signal generators and processing engine may be integrated into a light fitting such as into a lamp (see FIG. 7) that can be fitted into a standard socket such as a plugged, screwed or bayonet sockets conventional for incandescent lamps or such as a two pin socket as used for halogen lamps or LED indoor lamps. The light may be in a visible or non-visible region of the spectrum, e.g. preferably in the infra-red domain so as to be in a range for which, sensors systems are efficient, the human eye is blind and suitable light sources are available such as LED's. Such a lamp 200 can included power connections 202, 204, data signal connection 206, integrated ToF sensor 210 with associated electronics and signal processing means 216 as shown schematically in FIG. 7a, e.g. to form an integrated Tof camera. The lamp may also include, e.g. in the processing means 216 a processing engine such as a microprocessor or FPGA for carrying out signal and/or image processing as well as memory e.g. to form an integrated Tof camera. The memory may be volatile such as RAM and/or non-volatile memory, e.g. which can store one or more programs for execution on the processing engine. Such a modified lamp can therefore be fitted into a standard socket and power can be supplied for the illumination unit and the electronics from the power supply provided to the lamp. The lamp may include both non-visible such as IR lighting devices such as IR LED's 208 which are modulated with the multimodulation signal as well as lighting devices such as LED's in the visible spectrum. One of the modulations can be to generate a ToF signal e.g. for use with an integrated ToF camera. This ToF modulation can be applied to the non-visible, e.g. IR light sources. For example, the lamp or light source may contain one or more LED's for IR modulation and one or more LED's for visible light emission. The ToF modulation signal can be applied to the LED's for IR modulation. Optionally, shields 212 can be provided to prevent direct feedback from the LED's 208 to the receptor 210. The illuminating end of the lamp may be covered and sealed with a transparent cover 214 such as glass. The lamp 200 is preferably an LED based lamp as LED's operate at temperatures close to room temperature and hence heat generation in the lamp has little effect on the sensor and electronics that are integrated into the lamp. LED can also be modulated at high frequency required for TOF illumination.

Figure 7A:
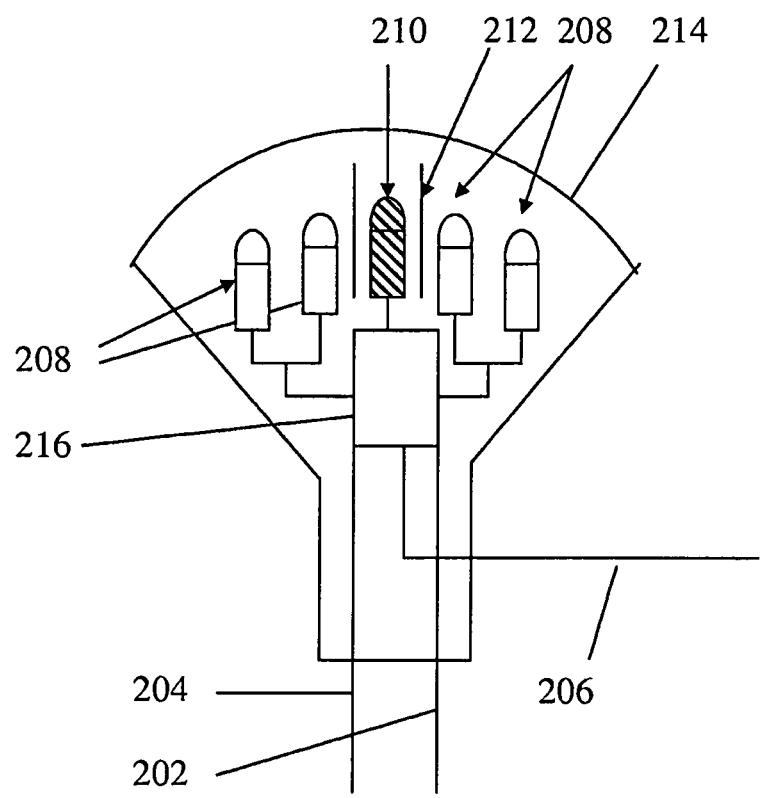
FIGS. 7a and b shows a light source according to embodiments of the present invention.
Figure 7B:
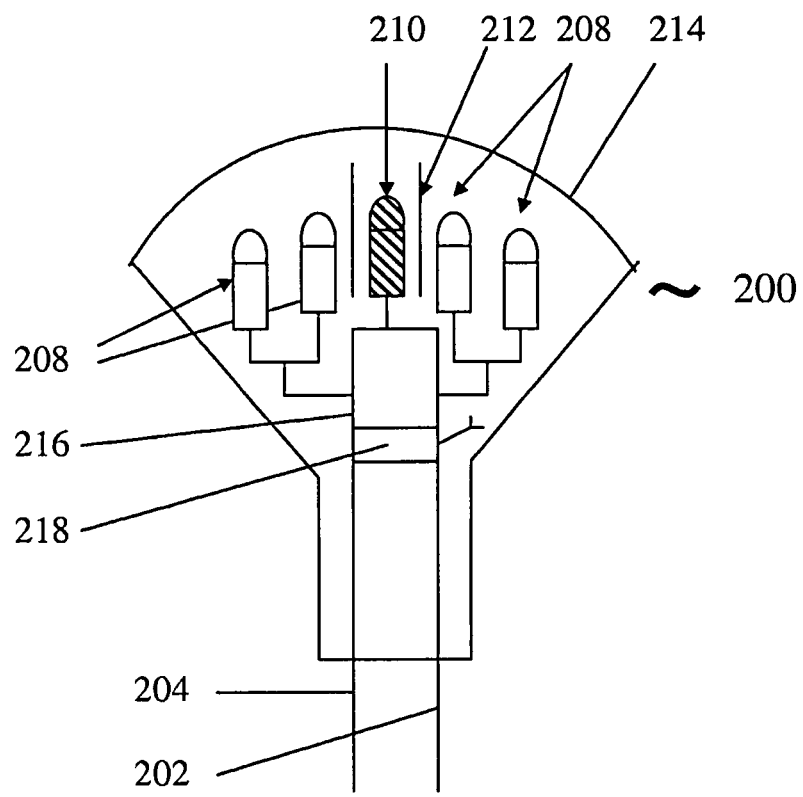

FIG. 7*b* shows a modification to the lamp of FIG. 7*a* in which a wireless communications interface 218 is provided instead of a wire connection 206. The wireless interface can be any suitable interface for Near Field Communication (Bluetooth, Wifi, LiFi, etc) or long range wireless interface such as operating with a 3GPP, GSM, UMTS, CDMA etc. protocol. The wireless interface 218 allows connection with a network and with other lamp devices of the same kind. The lamps may form an ad hoc network or mesh for example or other kind of Local Area Network.

Optionally, the light source may comprise means adapted for receiving and processing signals which may be generated by a device in a scene as a feedback information. The device in the scene may emit some signals of any kind to deliver at least feedback information to the system (or to the user) such as an ID, or another kind of feedback such as the providing notice of events, a parameter, a data (localization, status). Such communication could be achieved by a wireless connection such as uses light, radio, sound, vibration etc. The light source would then include an integrated receiver for the wireless signals as described above, for example. The system may make use of different communication means to provide feedback, e.g. there can be feedback by any means to the system that drives the TOF illumination unit and processes the TOF camera information and/or to a user in the scene.

Such a lamp or lamps can be used for surveillance and for security purposes as well as for a domestic or domotic purpose in controlling devices. The lamp can include an integrated ToF camera as described above as this may be used to detect activity such as movement of persons or objects or robots in a space such as a room, or it can be used to detect other objects such as animals, a fire, flooding, smoke etc. The light used may be in a visible or non-visible region of the spectrum, e.g. preferably in the infra-red domain so as to be in a range for which, sensors systems are efficient, the human eye is blind and suitable light sources are available such as LED's. Visiable light, e.g. modulated at a high frequency is particularly advantageous for surveillance when the light would be expected to be on.

Detection of such a person or object can trigger the modified lamp to emit a modulated second signal, e.g. carrying an information signal for control of a device in the room. As an example, the device may also comprise at least one active electronic, mechanical, hydraulic, electrical, electromagnetic or optical device whose operation can be controlled by the information carrying second modulated signal. The second signal received at the device from the ToF illumination unit may be demodulated and drives a command to activate or modify the operation of the device. Such a device may be e.g. for control of a door or window, of an alarm system, to switch on a device such as a computer, a sprinkler, a heater, a fan. As the lamp has a power supply which is provided as standard for lighting, the lamp security system requires no extra cables to be fitted allowing a rapid and economical deployment of the security system. It is therefore useful for transient security requirements such as at media or political events within buildings such as hotels or display halls.

Applications can be found in home automation systems that integrate electrical devices in a house with each other. These include building automation as well as the control of domestic activities, such as home entertainment systems, houseplant and yard watering, pet feeding, changing the ambiance "scenes" for different events (such as dinners or parties), and the use of domestic robots. The lamps may be connected through a computer network to allow control by a personal computer, and may allow remote access from the internet. Through the integration of the lamps with information technologies with the home environment, systems and appliances are able to communicate in an integrated manner which results in convenience, energy efficiency, and safety benefits.

The present invention also finds application in methods and systems for games. For example a display device such as a television can be provided with a computerized system connected or embedded to a screen of the display device, a software application being provided for operating the computerized system for execution of an interactive game. As described with reference to any of the FIGS. 1 to 6 the display device can include a 3D ToF based imaging system. The display device can be adapted to cooperate with a mobile device in the scene. The device can be used by a player in the interactive game. Alternatively the mobile device may be a hardware remote control system such as a television remote comprising an IR transceiver unit.

The computerized system connected to the ToF based imaging system and to the screen may comprise a gesture recognition system and an application operating the said computerized system e.g. a game for contextually driving the displayed content according to the recognized gestures. The user may interact with the computerized system by performing gestures. The user may handle the mobile device which can thus be located by the gesture recognition system. The system may interact with the user by sending a signal to the mobile device and through the illumination system of the ToF based imaging system thanks to the second modulation to which the IR transceiver is adapted.

As an example, the mobile device may also comprise at least one active electronic, mechanical, hydraulic, electrical, electromagnetic or optical device whose operation can be controlled by the information carrying second modulated signal. device a vibration unit. The second signal received from the ToF illumination unit may be demodulated and drives a command to activate vibrations for as for example is when the user performs a correct gesture in the context of an application for learning specific gestures.

While the invention has been illustrated and described in detail in the drawing and foregoing description, such illustration and description are to be considered illustrative or exemplary and not restrictive; the invention is not limited to the disclosed embodiments. Other variations to the disclosed embodiments can be understood and effected by those skilled in the art in practising the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention describes:

1. A system for use with a device, the system comprising:

a single illumination unit for illuminating a scene with respect to the ToF principle, a signal generator for generating a multimodulation signal and for supplying this multimodulation signal to the illumination unit, the signal generator being adapted to provide the multimodulation signal to the illumination unit having at least one modulation co-responding to the TOF signal and at least another modulation being for use by a first object in the illuminated scene or for controlling an operation of the first object in the illuminated scene.

2. A system for use with a device, the system comprising:

a ToF sensor arrangement including a sensor unit for use with a single illumination unit for illuminating a scene, the sensor arrangement comprising a means for determining a value related to a distance between the sensor unit and a first object in the scene based on the ToF principle, and a signal generator for generating a multimodulation signal and for supplying this signal to the illumination unit, the signal generator being adapted to provide the multimodulation signal to the illumination unit having at least one modulation for use by a second object in the illuminated scene or for controlling an operation of the second object in the illuminated scene.

3. The system of item 1 further comprising:

a ToF sensor arrangement including a sensor unit for use with a single illumination unit for illuminating a scene, the sensor arrangement comprising a means for determining a value related to a distance between the sensor unit and the first object or a second object in the scene based on the ToF principle.

4. The system of any of the items 2 or 3 further comprising a bidirectional interaction system for use with the illumination unit and for providing a bidirectional interaction with the first or the second object.

5. The system according to any of the items 2 to 4, further comprising a receiver for receiving an information signal transmitted from the first or second object.

6. The system according to any of the items 2 to 4, further comprising a TOF camera embedded in a display screen further comprising the illumination unit.

7. The system according to any of the items 1 to 6, further comprising a means for providing multimodulation.

8. The system according to any of the items 2 to 4, further comprising means for monodirectional interaction, means for tracking a system process and for deciding when commands are to be transferred to a tracked object in the scene.

9. The system according to any of the items 2 to 4, further comprising means for monodirectional interaction, means for tracking a system process and for deciding when commands are to be transferred to a tracked object in the scene with respect to the information provided by said tracked object.

10. The system according to any previous item wherein the system is a light source.

11. Circuitry comprising:

a single illumination unit for illuminating a scene with respect to the ToF principle, a signal generator for generating a multimodulation signal and for supplying this signal to the illumination unit, the signal generator being adapted to provide the multimodulation signal to the illumination unit having at least one modulation co-responding to the TOF signal and at least another modulation being for use by a first object in the illuminated scene or for controlling or operating the first object in the illuminated scene.

12. Circuitry comprising:

a ToF sensor arrangement including a sensor unit for use with a single illumination unit for illuminating a scene, the sensor arrangement comprising a means for determining a value related to a distance between the sensor unit and a first object in the scene based on the ToF principle, and a signal generator for generating a multimodulation signal and for supplying this signal to the illumination unit, the signal generator being adapted to provide the multimodulation signal to the illumination unit having at least one modulation for use by a second object in the illuminated scene or for controlling or operating the second object in the illuminated scene.

13. The circuitry of item 11 further comprising:

a ToF sensor arrangement including a sensor unit for use with a single illumination unit for illuminating a scene, the sensor arrangement comprising a means for determining a value related to a distance between the sensor unit and the first object or a second object in the scene based on the ToF principle.

14. The circuitry of any of the item 12 or 13 further comprising a bidirectional interaction system for use with the illumination unit and for providing a bidirectional interaction with the first or the second object.

15. The circuitry of according to any of the items 12 to 13, further comprising a receiver for receiving an information signal transmitted from the first or second object.

16. The circuitry according to any of the items 11 to 14, further comprising a TOF camera embedded in a display screen further comprising the illumination unit.

17. The circuitry according to any of the items 11 to 16, further comprising a means for providing multimodulation.

18. The circuitry according to any of the items 12 to 14, further comprising means for monodirectional interaction, means for tracking a system process and for deciding when commands are to be transferred to a tracked object in the scene.

19. The circuitry according to any of the items 12 to 14, further comprising means for monodirectional interaction, means for tracking a system process and for deciding when commands are to be transferred to a tracked object in the scene with respect to the information provided by said tracked object.

20. A method for use with a device, the method comprising:

illuminating a scene with respect to the ToF principle using a single illumination unit, generating a multimodulation signal and supplying this signal to the single illumination unit, at least one modulation being provided co-responding to the TOF signal to the illumination unit, and at least another one modulation having information data for use by a first object in the illuminated scene or for controlling or operating a first object in the illuminated scene.

21. A method for use with a device, the method comprising:

sensing using a sensor unit according to the ToF principle of light reflected from a scene illuminated by an illumination unit, determining a value related to a distance between the illumination unit or the sensor unit and a first object in the scene based on the ToF principle, and generating a multimodulation signal and supplying this signal to the illumination unit, at least one modulation being provided for use by a second object in the illuminated scene or for controlling an operation of the second object in the scene.

22. The method of item 20 further comprising:

sensing with a sensor unit in accordance with the ToF principle light reflected from a scene generated by an illumination unit illuminating a scene, and determining a value related to a distance between the illumination unit or the sensor unit and the first object or a second object in the scene based on the ToF principle.

23. The method of any of the items 21 or 22 further comprising providing a bidirectional interaction with the first or the second object.

24. The method according to any of the items 21 to 23, further comprising receiving an information signal transmitted from the first or second object.

25. The method according to any of the items 20 to 24, further comprising providing a multimodulation signal to the illumination unit.

26. The method according to any of the items 21 to 23, providing monodirectional interaction, tracking a system process and deciding when commands are to be transferred to a tracked object in the scene.

27. The method according to any of the items 21 to 23, further comprising providing monodirectional interaction, tracking a system process and deciding when commands are to be transferred to a tracked object in the scene with respect to the information provided by said tracked object.

28. A light source comprising:
an illumination unit for illuminating a scene,
a signal generator integrated into the light source for generating a multimodulation signal and for supplying this multimodulation signal to the illumination unit, the signal generator being adapted to provide the multimodulation signal to the illumination unit having at least one modulation co-responding to a TOF signal and at least another modulation different from the first modulation.

29. A light source comprising:
an illumination unit for illuminating a scene,
a signal generator integrated into the light source for generating a multimodulation signal and for supplying this multimodulation signal to the illumination unit, the signal generator being adapted to provide the multimodulation signal to the illumination unit having at least one modulation co-responding to a TOF signal and a transmitter for transmitting a wireless signal operating to a wireless communications protocol.

30. The light source of item 28 or 29 wherein a TOF camera is integrated into the light source.

The invention claimed is:
1. Circuitry comprising:
an illumination unit configured to illuminate a scene including a first object;
at least one signal generator configured to generate a multimodulated signal, the signal generator being adapted to provide the multimodulated signal to the illumination unit, wherein the illumination unit is configured to illuminate the scene by simultaneously projecting periodic light at two or more modulation frequencies in accordance with the multimodulated signal generated by the at least one signal generator, wherein the multimodulated signal specifies a first modulation frequency and a second modulation frequency, wherein the first modulation frequency and the second modulation frequency are different, wherein the second modulation frequency encodes control information to control an operation of the first object in the illuminated scene; and
a sensor arrangement including a sensor, wherein the sensor arrangement is configured to receive reflected light corresponding to the periodic light projected at the first modulation frequency and to determine, based on a characteristic of the received reflected light and a Time-of Flight (ToF) principle, a value related to a distance between the sensor and the first object in the illuminated scene or a value related to a distance between the sensor and a second object in the illuminated scene.

2. Circuitry according to claim 1,
wherein the illumination unit is configured to project the periodic light at a third modulation frequency different from the second modulation frequency, wherein the periodic light projected at the third modulation frequency provides information to the second object in the illuminated scene to control an operation of the second object.

3. Circuitry according to claim 1,
wherein the sensor arrangement is configured to determine a value related to a distance between the sensor unit and the first object in the illuminated scene.

4. Circuitry according to claim 2, further comprising a bidirectional interaction system configured to provide a bidirectional interaction with the first object or the second object.

5. Circuitry according to claim 2, further comprising a ToF camera embedded in a display screen including the illumination unit.

6. Circuitry according to claim 2, further comprising a processing unit configured to provide monodirectional interaction, tracking a system process, and wherein the processing unit is further configured to determine when commands are to be transferred to a tracked object in the illuminated scene.

7. Circuitry according to claim 1, further comprising:
a receiver configured to receive feedback from the first object in the illuminated scene, wherein the illumination unit is configured to project the periodic light at a third modulation frequency different than the first and second modulation frequencies based, at least in part, on the received feedback.

8. Circuitry according to claim 7, wherein the third modulation frequency encodes updated control information to control an operation of the first object in the illuminated scene.

9. Circuitry according to claim 7, wherein the feedback is received as a light signal emitted from the first object.

10. Circuitry according to claim 1, wherein the sensor is further configured to generate a background current in response to receiving background light from secondary sources outside of the illuminated scene, and wherein the circuitry further comprises mixer circuitry configured to mix the generated background current with modulated light current associated with the received reflected light corresponding to the periodic light projected at the first modulation frequency.

11. A method for use with a device, the method comprising:
generating a multimodulated signal specifying at least a first modulation frequency and a second modulation frequency, wherein the first modulation frequency and the second modulation frequency are different, wherein the second modulation frequency encodes control information to control an operation of a first object in an illuminated scene;
supplying the multimodulated signal to an illumination unit;
illuminating the scene using the illumination unit, wherein illuminating the scene comprises projecting periodic light at two or more modulation frequencies in accordance with the multimodulated signal;
sensing with a sensor, reflected light corresponding to the periodic light projected at the first modulation frequency; and
determining, based on a characteristic of the sensed reflected light and a Time-of Flight (ToF) principle, a value related to a distance between the sensor and the first object in the illuminated scene or a value related to a distance between the sensor and a second object in the illuminated scene.

12. The method of claim 11, wherein illuminating the scene further comprises emitting the periodic light at a third modulation frequency different from the second modulation frequency, wherein the third modulation frequency encodes control information to control an operation of the second object in the illuminated scene.

13. The method of claim 11, wherein determining a value related to a distance between the sensor and the first object in the illuminated scene or a value related to a distance between the sensor and the second object in the illuminated scene comprises determining a value related to a distance between the sensor unit and the first object in the illuminated scene.

14. The method of claim 13, further comprising providing a bidirectional interaction with the first object or the second object.

15. The method according claim 12, further comprising providing monodirectional interaction, tracking a system process, and deciding when commands are to be transferred to a tracked object in the illuminated scene.

16. A light source comprising:
an illumination unit configured to illuminate a scene including a first object; and
at least one signal generator integrated with the light source, wherein the at least one signal generator is configured to generate a multimodulated signal, the at least one signal generator being adapted to provide the multimodulated signal to the illumination unit, wherein the illumination unit is configured to illuminate the scene by simultaneously projecting periodic light at two or more modulation frequencies in accordance with the multimodulated signal generated by the at least one signal generator, wherein the multimodulated signal specifies a first modulation frequency and a second modulation frequency, wherein the first modulation frequency and the second modulation frequency are different, wherein reflected light corresponding to the periodic light projected at the first modulation frequency is used to determine a distance measurement related to the first object or a second object in the illuminated scene, and wherein the periodic light projected at the second modulation frequency is used to control an operation of the first object in the illuminated scene.

17. A light source according to claim 16, further comprising a transmitter configured to transmit a wireless signal operating in accordance with a wireless communications protocol.

18. The light source according to claim 16, wherein a ToF camera is integrated with the light source.

19. Circuitry according to claim 1, wherein the second modulation frequency is parametric to the first modulation frequency.

* * * * *